(12) United States Patent
Okumura et al.

(10) Patent No.: US 7,640,827 B2
(45) Date of Patent: Jan. 5, 2010

(54) GEAR UNIT OF SMALL MOTOR

(75) Inventors: Takeshi Okumura, Matsudo (JP);
Kazuyuki Yamamoto, Matsudo (JP);
Shinichi Taniguchi, Matsudo (JP)

(73) Assignee: Mabuchi Motor Co., Ltd., Chiba (JP)

( * ) Notice: Subject to any disclaimer, the term of this patent is extended or adjusted under 35 U.S.C. 154(b) by 613 days.

(21) Appl. No.: 10/983,344

(22) Filed: Nov. 8, 2004

(65) Prior Publication Data

US 2005/0115349 A1 Jun. 2, 2005

(30) Foreign Application Priority Data

Nov. 28, 2003 (JP) .............................. 2003-398468

(51) Int. Cl.
*F16H 61/00* (2006.01)
(52) U.S. Cl. ...................... 74/606 R; 74/425; 74/89.14
(58) Field of Classification Search .................. 74/425, 74/421 A, 89.14, 606 R; 29/527.1, 527.2; 464/180, 181, 182; 384/107; 403/270, 268, 403/276, 267, 265
See application file for complete search history.

(56) References Cited

U.S. PATENT DOCUMENTS

| 1,693,848 | A | * | 12/1928 | Kyle ............................ 403/268 |
| 3,377,662 | A | * | 4/1968 | Fukushima ................. 425/401 |
| 5,040,430 | A | * | 8/1991 | Adam et al. .................. 74/425 |
| 5,259,261 | A | * | 11/1993 | Michel ........................ 74/425 |
| 5,398,564 | A | * | 3/1995 | Yoshida et al. ................ 74/425 |
| 5,410,921 | A | * | 5/1995 | Deynet et al. ............... 74/89.14 |
| 6,272,942 | B1 | * | 8/2001 | Ganser ......................... 74/425 |
| 6,591,707 | B2 | * | 7/2003 | Torii et al. ..................... 74/425 |
| 6,595,868 | B1 | * | 7/2003 | Androlia ..................... 473/318 |
| 6,925,899 | B2 | * | 8/2005 | Ozeki .......................... 74/422 |
| 6,929,372 | B2 | * | 8/2005 | Olijnyk et al. ............... 359/841 |
| 2002/0011127 | A1 | | 1/2002 | Torii et al. |
| 2007/0196035 | A1 | * | 8/2007 | Shibahara et al. ........... 384/107 |

FOREIGN PATENT DOCUMENTS

| DE | 4427410 A1 | 2/1996 |
| DE | 4323008 C2 | 7/1996 |
| DE | 19833672 A1 | 5/1999 |
| DE | 10137213 A1 | 3/2002 |
| DE | 10042678 C2 | 9/2002 |
| JP | 6-38449 | 2/1994 |

\* cited by examiner

*Primary Examiner*—Richard W L Ridley
*Assistant Examiner*—Alan B Waits
(74) *Attorney, Agent, or Firm*—McGlew and Tuttle, P.C.

(57) ABSTRACT

Driving torque outputted from a motor portion is transmitted to a worm from a motor shaft, further to a helical gear from the worm, and is taken out to the outside from an output shaft which rotates together with the helical gear with a fixed shaft fixed to a gear box as a center. This fixed shaft is constructed in a hollow and cylindrical shape having an opening in which one end portion thereof has been opened, and a ceiling surface in which the other end portion thereof has been closed, and one end portion of this fixed shaft is subjected to dislocation preventive work, and is fixed to a gear box made of resin by pressing-in or insert molding. The other end portion of the fixed shaft is formed with the dislocation preventive structure of the output shaft and the helical gear installed to the fixed shaft.

12 Claims, 7 Drawing Sheets

RADIUS PORTION

DRILL-RIVET
OUTPUT SHAFT
FIXED SHAFT
HELICAL GEAR
DISLOCATION PREVENTIVE MACHINING
GEAR BOX

FIG. 5A
FIG. 5C
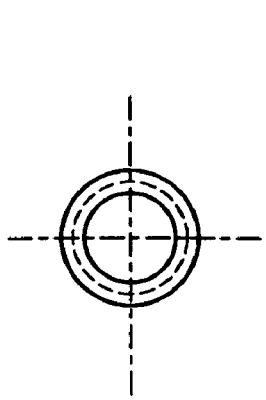
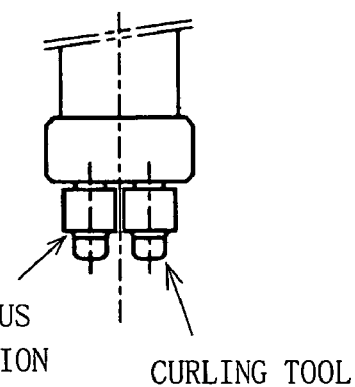
RADIUS PORTION
CURLING TOOL
FIG. 5B
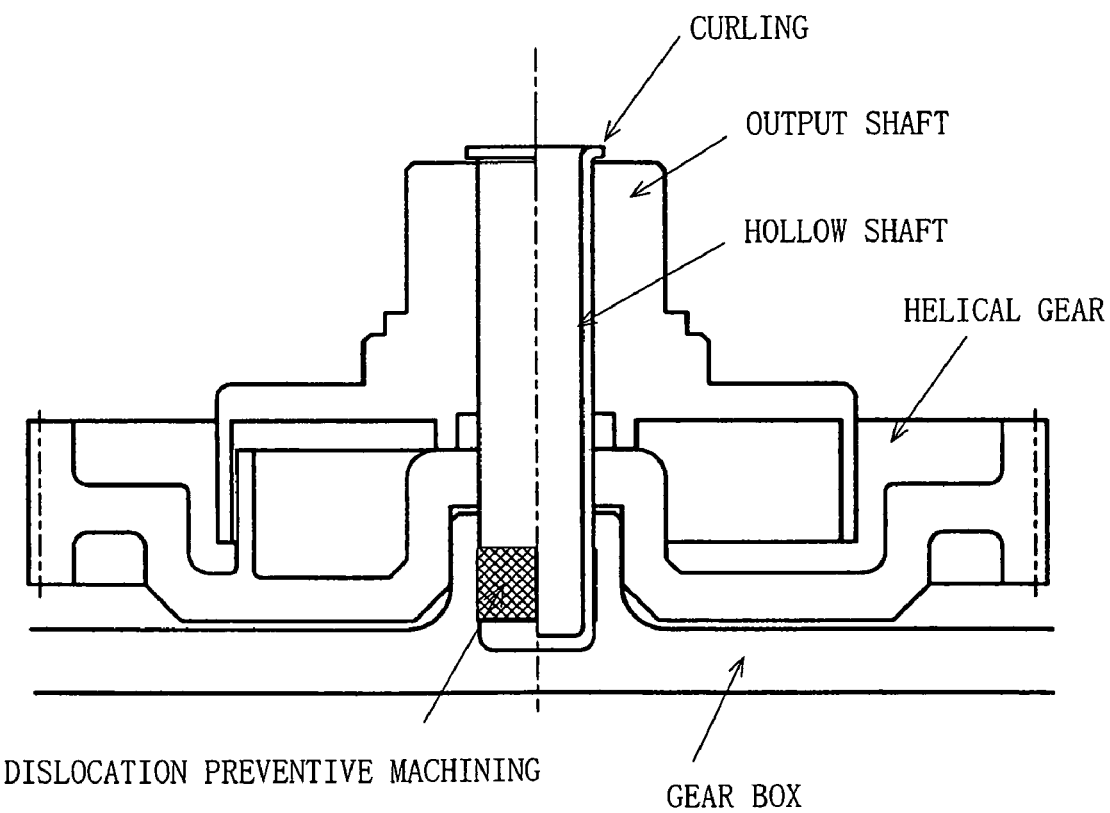
CURLING
OUTPUT SHAFT
HOLLOW SHAFT
HELICAL GEAR
DISLOCATION PREVENTIVE MACHINING
GEAR BOX

GEAR UNIT OF SMALL MOTOR

BACKGROUND OF THE INVENTION

1. Field of the Invention

The present invention relates to a gear unit of a small motor in which driving torque outputted from a motor portion is taken out to the outside from an output shaft which rotates together with a helical gear, via a worm and the helical gear from a motor shaft further with a fixed shaft fixed to a gear box as a center.

2. Description of the Related Art

FIG. 6 is a view exemplifying a small motor with a gear unit which has been generally used conventionally, FIG. 6A is a general view for the small motor with a gear unit, showing the gear unit portion in a partial sectional view, and FIG. 6B is a view exemplifying the gear unit portion shown in a partial sectional view as seen from a direction different from FIG. 6A. Also, FIGS. 7A and 7B are views exemplifying a C-type snap ring as seen from directions different respectively, and FIG. 7C is an enlarged view showing an essential part of FIG. 6B.

As shown in FIG. 6, a motor portion is installed to the gear unit portion through the use of a screw or the like. The gear unit portion has, within a gear box made of resin, a worm fixed near the tip portion of a motor shaft extended from the motor portion, a helical gear engaging with this worm, and the output shaft for taking out driving torque to the outside from this helical gear. Such a small motor with a gear unit can be used for driving, for example, an automotive power window.

The worm can be fixed by, for example, forming a knurled portion on the motor shaft, and providing the worm with a worm fitting hole for fitting in it to press the worm into the motor shaft. Since a helical gear for constituting a worm wheel is engaged with this worm, the driving torque outputted from the motor portion is transmitted from the motor shaft to the worm, is transmitted from the worm to the helical gear in the gear unit portion, and is taken out form the output shaft to the outside. Since in the output shaft and the helical gear, mutual movement in a direction of rotation is regulated via shock absorbing rubber, they are constructed so as to rotate, with the fixed shaft fixed to the gear box as a center, around it in a body.

Conventionally, the fixed shaft of the gear box has been constructed by a solid shaft obtained by cutting steel material or the like, and has been fixed in a cantilever state by pressing into a gear box made of resin or insert molding or the like. At this time, in order that the fixed shaft is prevented from coming off from the gear box, the end portion of the fixed shaft which is fixed to the gear box by pressing-in or insert molding has been subjected to dislocation preventive work such as knurling work.

Also, in order to prevent a part such as the helical gear and the output shaft from coming off from the fixed shaft in a thrust direction, a groove has been cut around the fixed shaft in the vicinity of the tip side (the other side of the fixed side) of the fixed shaft, and in this groove, a C-type snap ring or the like has been fitted for fixing.

Since it has been obtained by cutting steel material or the like as described above, the conventional fixed shaft has had drawbacks that it is high in machining cost, heavy in weight because of a solid shaft, and the material cost is also expensive. In the vehicle motor, there is a request for weight reduction from fuel economy and environmental problems.

Also, in order to prevent corrosion, surface treatment such as plating has been required after machining. Further, in order to prevent the helical gear, the output shaft and the like from coming off in the thrust direction, it is necessary to groove the fixed shaft and fix through the use of a C-type snap ring or the like, and therefore, the number of parts is increased, it takes time to assemble, and the cost is increased.

[Patent Literature 1] Japanese Patent Laid-Open No. 6-38449

SUMMARY OF THE INVENTION

It is an object of the present invention to solve such problems, and to make it possible to construct the fixed shaft by deep drawing a plate-shaped member, to eliminate the need for corrosion prevention processing after machining, and not only to reduce the machining cost and material cost, but also to reduce the weight.

Also, it is an object of the present invention to eliminate the need for a special part or machining for preventing the helical gear, the output shaft and the like from coming off in the thrust direction, or preventing the fixed shaft from coming off from the gear box to thereby reduce the number of parts and facilitate assembly for reducing the cost.

In the gear unit of a small motor according to the present invention, driving torque outputted from a motor portion is transmitted to a worm from a motor shaft, further to a helical gear from the worm, and is taken out to the outside from an output shaft which rotates together with the helical gear with a fixed shaft fixed to a gear box as a center. This fixed shaft is constructed in a hollow and cylindrical shape having an opening in which one end portion thereof has been opened, and a ceiling surface in which the other end portion thereof has been closed, and one end portion of this fixed shaft is subjected to dislocation preventive work, and is fixed to a gear box made of resin by pressing-in or insert molding. The other end portion of the fixed shaft is formed with dislocation preventive structure of the output shaft and the helical gear installed to the fixed shaft.

Also, as dislocation preventive structure of the output shaft and the helical gear which is to be formed at the other end portion of the fixed shaft, the snap ring which has been pressed into the tip side of the fixed shaft can be used.

Also, the fixed shaft can be constructed in a hollow and cylindrical shape by deep drawing a plate-shaped member, and at the time of the deep drawing, the structure can be arranged such that the fixed shaft is prevented from coming off from the gear box made of resin to be insert-molded through the use of a collar-shaped skirtlike portion to be formed on the outer periphery on the side of the opening of the fixed shaft. By boring a small hole in the ceiling surface of the fixed shaft, the structure can be arranged so as to breathe on insert molding.

Also, by pressing-in or insert-molding after the circumference side near to the ceiling surface is subjected to dislocation preventive work, the ceiling surface side of the fixed shaft is fixed to the gear box. On the other hand, the structure for preventing the helical gear and the output shaft from coming off in the thrust direction can be formed on the opening side of the fixed shaft. This preventive structure is cutting-staking or curling to be formed on the opening side of the fixed shaft.

According to the present invention, by making the fixed shaft into a hollow shaft, its weight could be reduced by about 60%. Also, through the use of a galvanized sheet, since the corrosion prevention effect can be expected, surface treatment after the machining becomes unnecessary, and it becomes possible to reduce the weight of the gear unit and the cost. By changing from the machining by a machine to deep drawing by a press, the production efficiency can be raised.

As regards fixing of the helical gear and the output shaft in the thrust direction, by changing into the hollow shaft, it becomes possible to use the snap ring, whereby there is no need for grooving, but the assembly man-hour can be reduced. Further, by changing into the hollow shaft, it becomes possible to subject the end of the fixed shaft to working such as cutting-staking and curling, whereby there is no need for a part such as the C-type snap ring which has been conventionally required, but it becomes possible to reduce the number of parts, and to further reduce the weight and the cost.

BRIEF DESCRIPTION OF THE DRAWINGS

FIG. 5 is a view showing a fourth example further different;

FIG. 6 is a view exemplifying a small motor with a gear unit which has been generally used conventionally.

DETAILED DESCRIPTION OF THE PREFERRED EMBODIMENTS

Figure 1A:
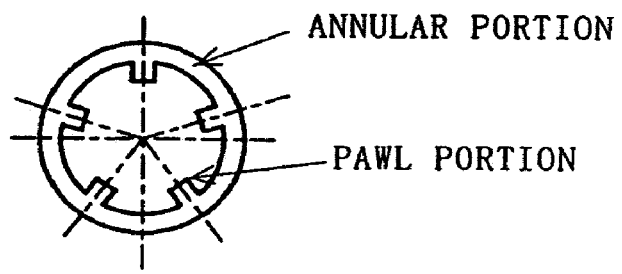
FIGS. 1A and 1B exemplify the snap ring as seen from directions different from each other, and FIG. 1C exemplifies an essential portion of the gear unit in sectional view.
Figure 1B:
Figure 1C:
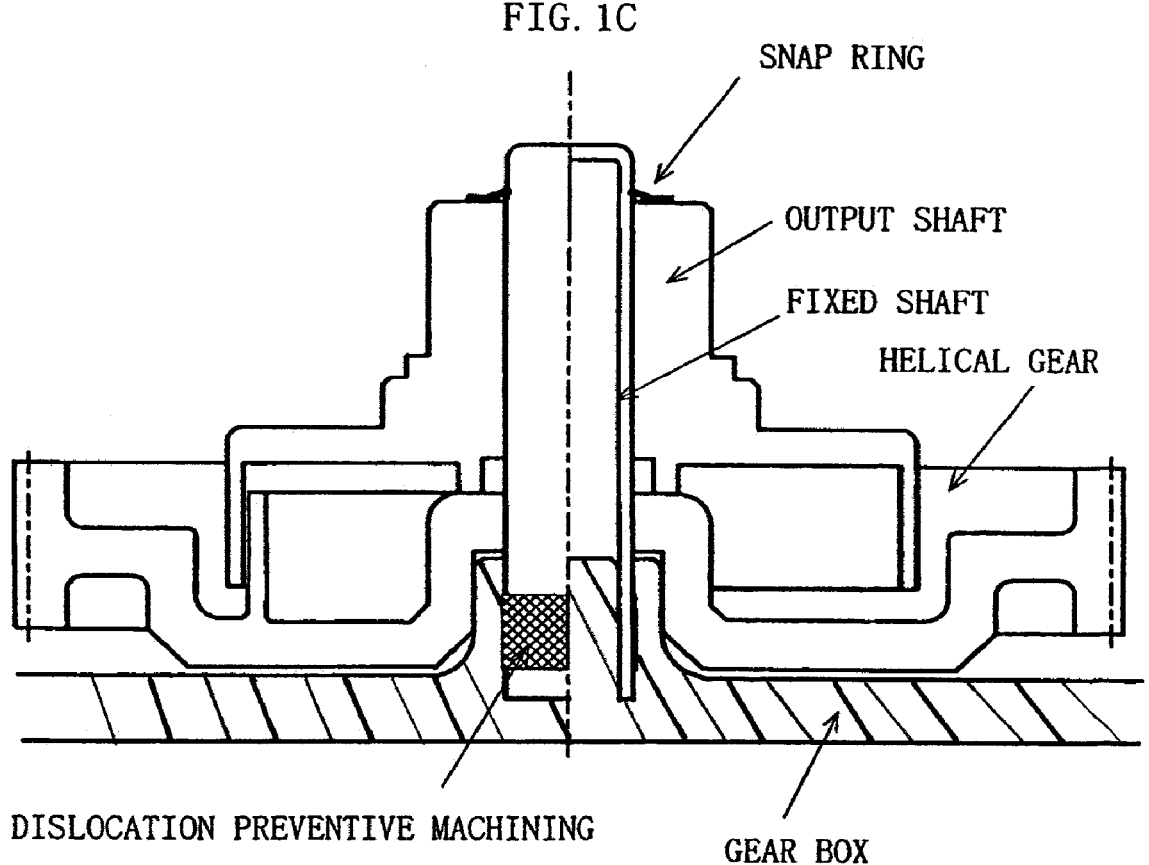
FIG. 1 is a view showing a first example of a gear unit portion embodying the present invention.

Hereinafter, on the basis of the exemplifications, the description will be made of the present invention. FIG. 1 is a view showing a first example of a gear unit portion embodying the present invention. FIGS. 1A and 1B exemplify the snap ring as seen from directions different from each other, and FIG. 1C exemplifies an essential portion of the gear unit in sectional view. The present invention is characterized by structure of the fixed shaft, the fixing structure of the fixed shaft to the gear box and the dislocation preventive structure of the output shaft from the fixed shaft, and as regards any structure other than these, the structure similar to such conventional structure as exemplified in FIG. 6 can be adopted.

Figure 6A:
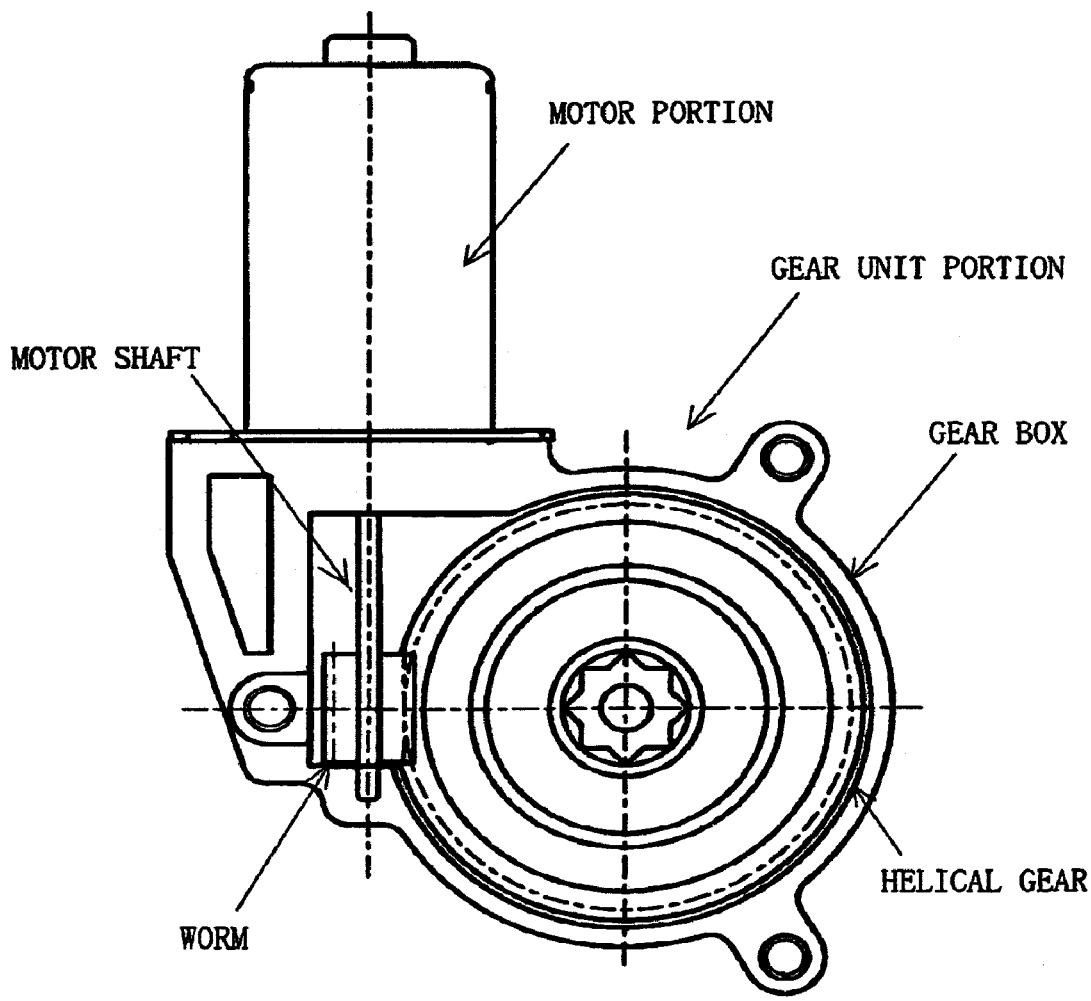
FIG. 6A is a general view for the small motor with a gear unit, showing the gear unit portion in a partial sectional view.
Figure 6B:
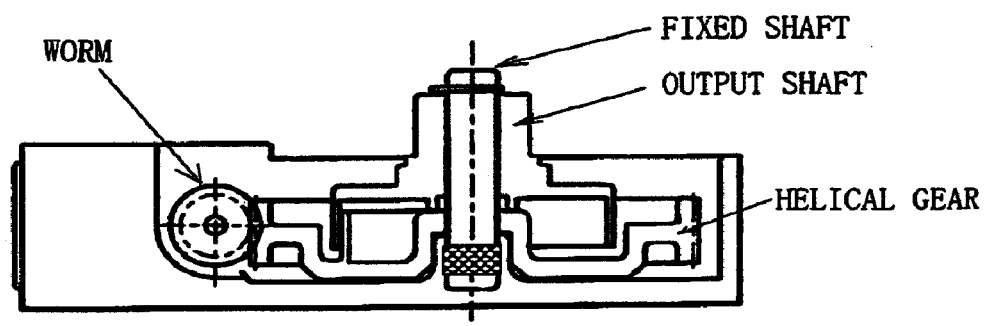
FIG. 6B is a view exemplifying the gear unit portion shown in a partial sectional view as seen from a direction different from FIG. 6A.
Figure 7A:
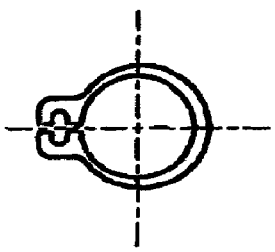
FIGS. 7A and 7B are views exemplifying a C-type snap ring as seen from directions different respectively.
Figure 7B:
Figure 7C:
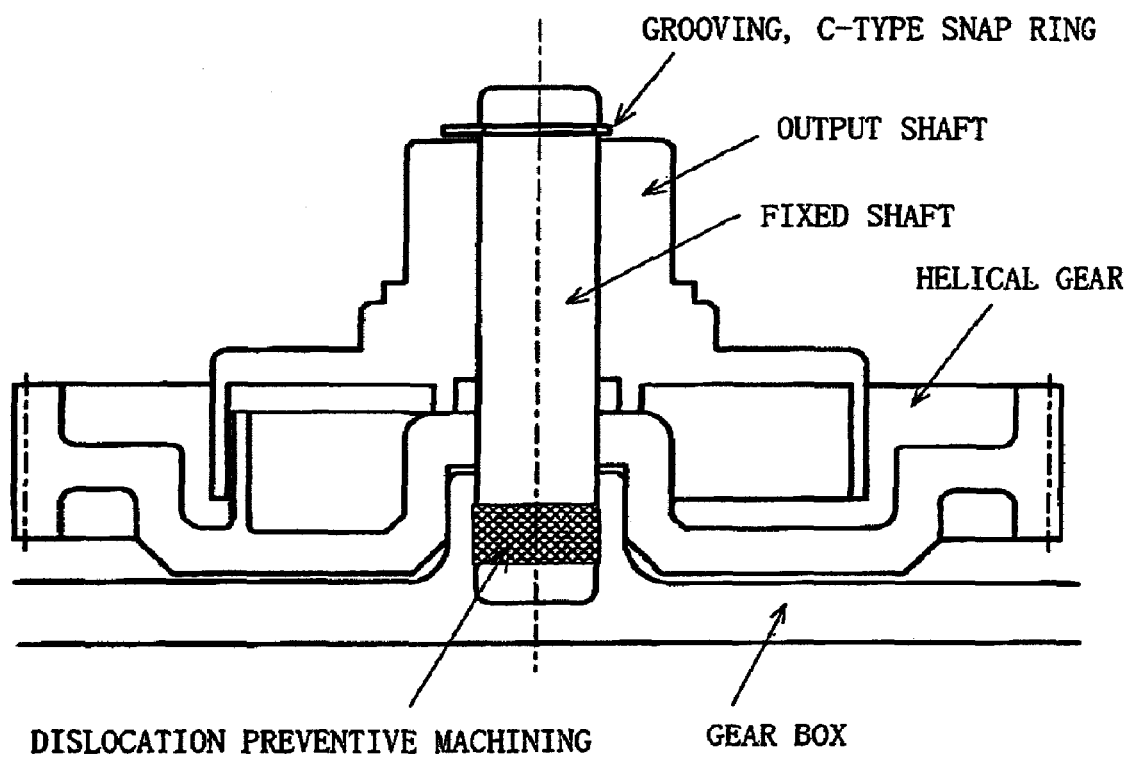
FIG. 7C is an enlarged view showing an essential part of FIG. 6B.

Therefore, the helical gear exemplified in FIG. 1 is also, within the gear box made of resin as in the structure shown in FIG. 6, constructed so as to engage with a worm fixed near the tip portion of a motor shaft extended from the motor portion. Also, the gear unit portion constructed as described above is, as in the structure shown in FIG. 6, installed to the motor portion through the use of a screw and the like.

Since as described above, even in the gear unit portion exemplified in FIG. 1C, the helical gear constituting the worm wheel has been engaged with the worm, the driving torque outputted from the motor portion is transmitted from the motor shaft to the worm, is transmitted from the worm to the helical gear in the gear unit portion, and is taken out from the output shaft to the outside. The output shaft and the helical gear are constructed so as to rotate, with the fixed shaft fixed to the gear box as a center, around it in a body. Also, the end portion of the fixed shaft to be fixed to the gear box through the use of pressing-in or insert-molding (method for flowing resin in a state in which the fixing shaft has been arranged within a die in advance for molding) has been subjected to dislocation preventive working such as press work (concave-convex work) or knurling work.

Although the above-described structure can be made into the same one as the conventional structure, the gear unit portion exemplified in FIG. 1C is characterized in that the fixed shaft is made into a hollow shaft, and that the snap ring has been used in order to apply the dislocation preventive structure to the output shaft and the helical gear.

Figure 2A:
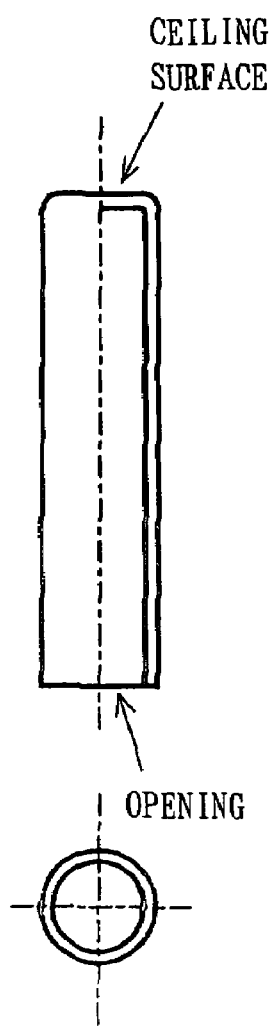
FIGS. 2A, 2B and 2C exemplify structure which can be used as a fixed shaft according to the present invention respectively.
Figure 2B:
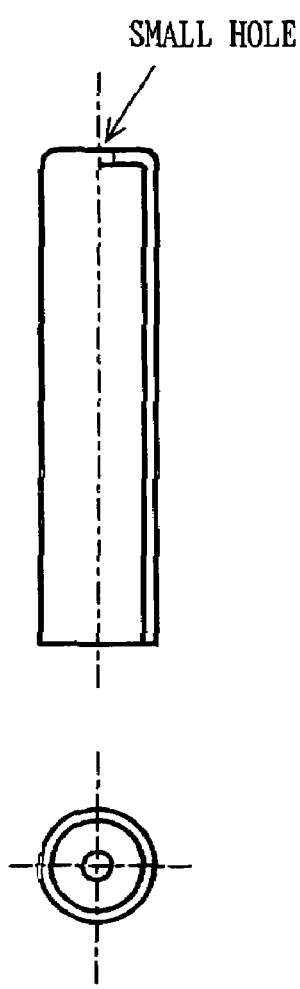
Figure 2C:
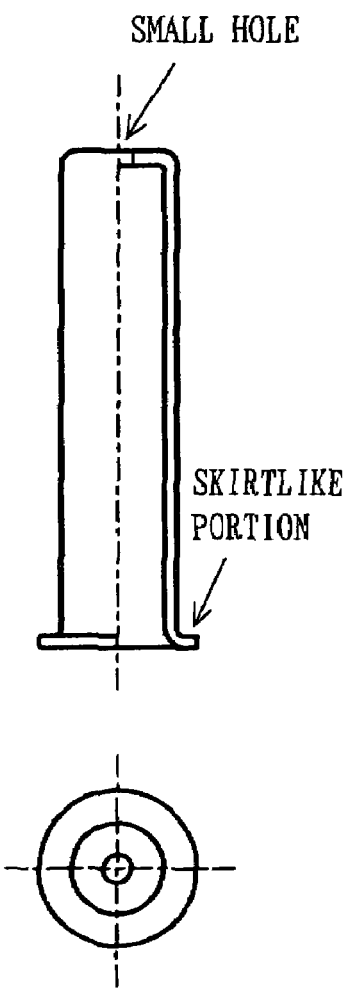

FIGS. 2A, 2B and 2C exemplify structure which can be used as a fixed shaft according to the present invention respectively. By deep drawing, for example, a galvanized steel sheet, any example is constructed in a hollow and cylindrical shape having an opening in which one end portion thereof has been opened, and a ceiling surface in which the other end portion thereof has been closed as shown. The galvanized sheet can be usually used as, for example, case material for the small motor or the like, and galvanized sheets subjected to surface treatment such as plating are currently on the market. By deep drawing such plate-shaped members subjected to surface treatment, it becomes unnecessary to perform plating processing again.

When usually deep drawing a plate-shaped member, on the opening side, a collar-shaped skirtlike portion is formed on its outer periphery as the next logical step. In the hollow and cylindrical member exemplified in FIG. 2C, this skirt like portion remains without being cutoff. In contrast, the hollow and cylindrical member exemplified in FIGS. 2A and 2B is obtained by cutting off the skirtlike portion after the deep drawing. Also, in FIGS. 2B and 2C, a small hole has been bored in the ceiling surface by taking into account gassing during the insert molding.

As regards the fixed shaft exemplified in FIG. 1, the outer peripheral surface near the end portion of the hollow shaft shown in FIG. 2A on the opening side is subjected to dislocation preventive work such as press work or knurling work, and the fixed shaft is fixed to the gear box by pressing-in. Also, this fixed shaft can be also fixed to the gear box by insert molding, and at the time of the insert molding, a hollow shaft, on the ceiling surface of which a small hole has been bored as shown in FIG. 2B, will be used such that the interior of the hollow shaft is also filled with resin. Although it is not indispensable to fill the hollow shaft with resin, it is not desirable that there occurs such a variation for each product as the hollow shaft is filled with resin or is only partially filled. In this respect, since the interior of the hollow shaft is filled with resin, "falling strength" of the hollow shaft will be improved. This is especially effective in the case of the cantilever such as the structure of the present invention.

In order to prevent the helical gear and the output shaft from coming off in the thrust direction after these are installed, a snap ring is pressed into the tip side of the hollow fixed shaft. The snap ring is constructed of a so-called spring member, and has such a shape as exemplified in FIGS. 1A and 1B. The snap ring has a plurality of pawl portions for extending from the annular portion in an inside direction, and when it is pressed into the fixed shaft, this snap ring is fixed such that the pawl portions bite the outer peripheral surface of the fixed shaft.

The conventional fixed shaft has been constructed of a solid shaft obtained by cutting steel material or the like, whereas the fixed shaft exemplified in FIG. 1 is formed by a plate-shaped member such as a galvanized sheet, and is formed in a hollow shape, and therefore, is more flexible than the solid shaft, and the outer peripheral surface of the fixed shaft slightly becomes plastic-deformed. Therefore, it becomes possible to press such a snap ring as shown in.

Figure 3A:
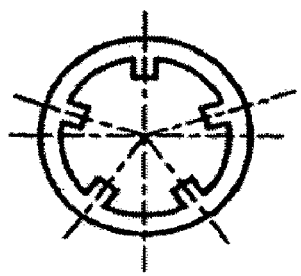
FIG. 3 is a view similar to FIG. 1, but is a view showing a second example different from FIG. 1.
Figure 3B:
Figure 3C:
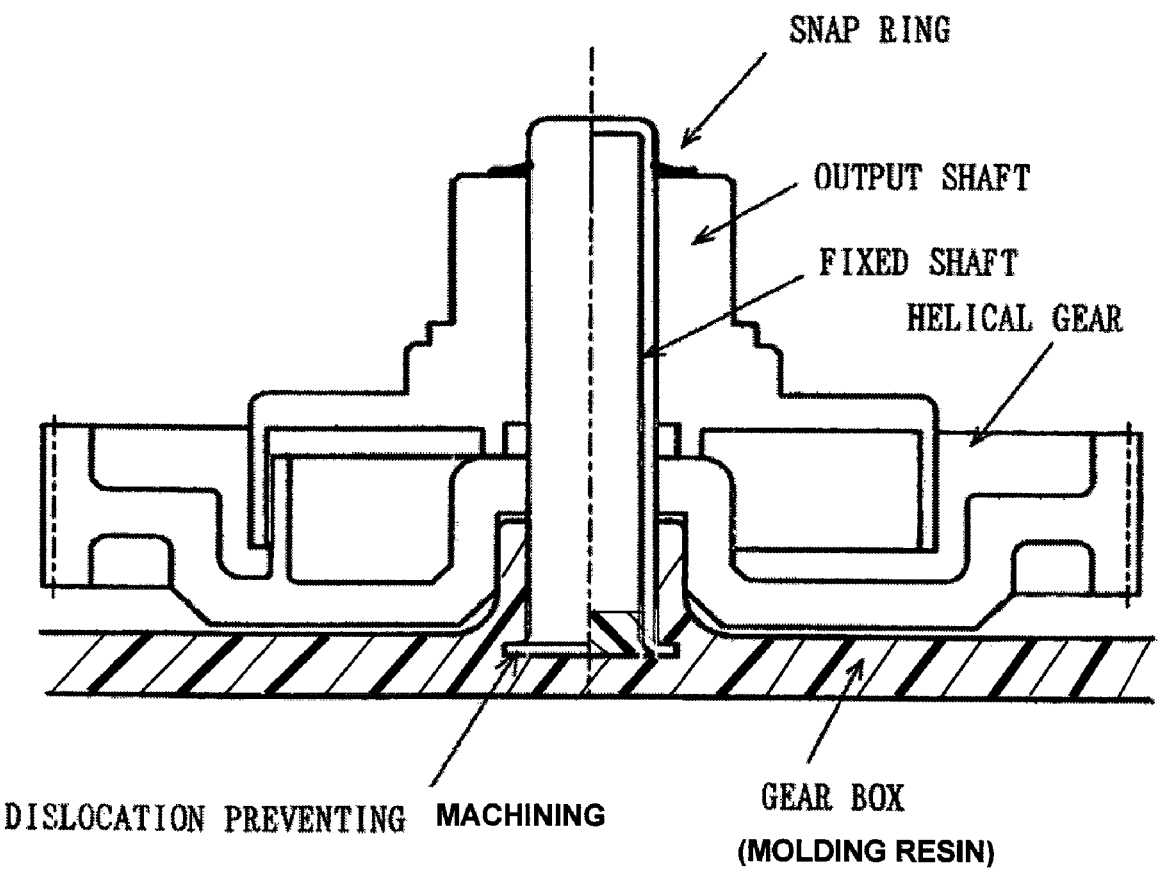

FIG. 3 is a view similar to FIG. 1, but is a view showing a second example different from FIG. 1. As a fixed shaft to be used in this case, there is used a hollow shaft having the shape of FIG. 2C. The fixed shaft of this structure is fixed to the gear box by insert molding. In the fixed shaft of this structure, since a collar-shaped skirtlike portion to be formed at the time of the deep drawing remains as it is on the outer periphery of the end portion on the opening side, this functions as dislocation preventing undercut. Thus, as in the case of the example of FIG. 1, in order to prevent the helical gear and the output shaft from coming off in the thrust direction after these are installed, a snap ring is pressed in.

Figure 4A:
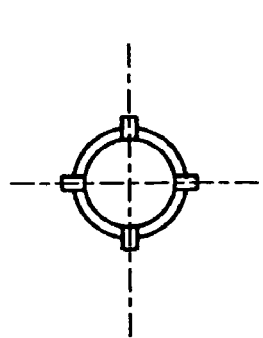
FIG. 4A is a top view of the opening end fo the fixed shaft which has been formed via cutting staking.
Figures 4C, 4D:
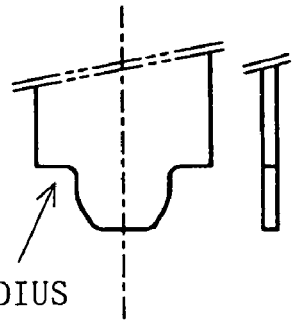
FIG. 4C is a front view of a cutting staking tool.
FIG. 4D is a side view of the cutting staking tool.
Figure 4B:
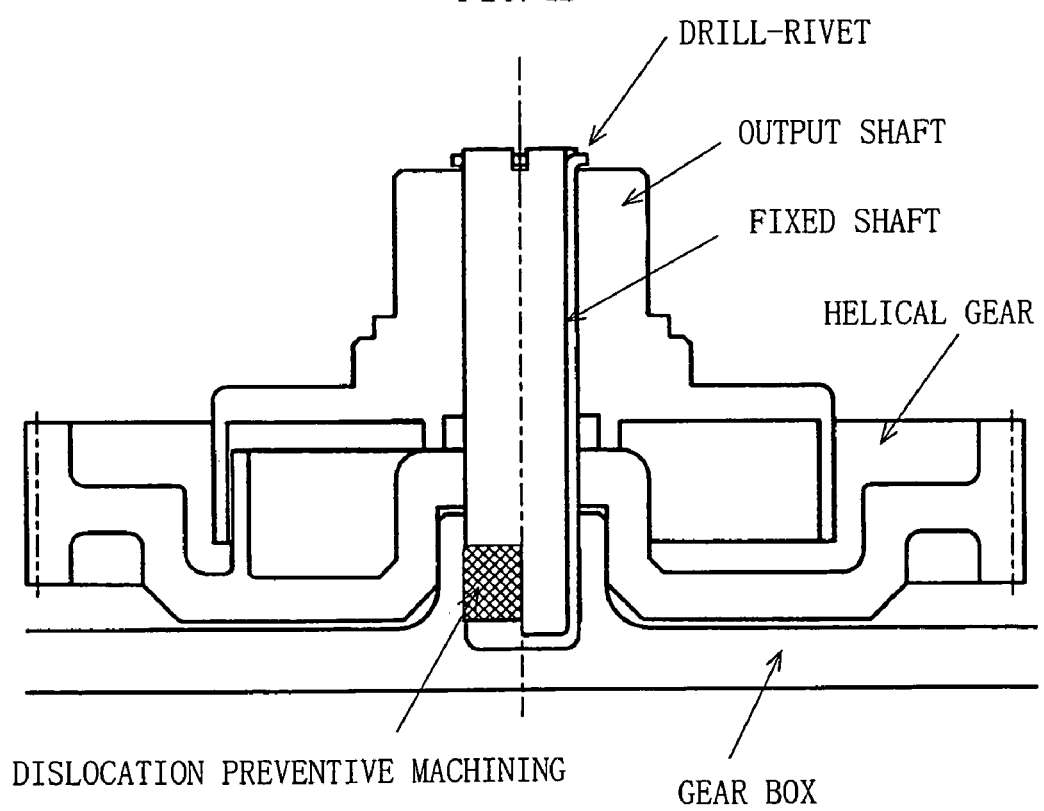
FIG. 4B is a sectional view of another embodiment of the gear unit.

FIG. 4 is a view showing a third example different from FIGS. 1 and 3. As a fixed shaft to be used in this case, there is used a hollow shaft having the shape of FIG. 2A. In the fixed shaft of this structure, after the circumference side near to the ceiling surface is subjected to dislocation preventive work such as press work and knurling work, the ceiling surface side is fixed to the gear box by pressing-in or insert molding. Thus, as structure for preventing the helical gear and the output shaft from coming off in the thrust direction after these are installed, cutting staking is formed on the opening side of the fixed shaft. FIG. 4A is a view in which the fixed shaft has been seen from a side of the cutting staking formed on the opening side. Also, FIGS. 4C and 4D are views in which a cutting staking tool (so-called cutting knife) has been seen from different directions respectively. A load is applied to such cutting staking tool in an axial direction of the fixed shaft from top to bottom in the figure, whereby the cutting staking which cuts open the opening side of the fixed shaft is formed by a radius portion of the plate-shaped cutting staking tool.

FIG. 5 is a view showing a fourth example further different. As a fixed shaft to be used in this case, there is used a hollow shaft having the shape of FIG. 2A. With the exception of the structure for preventing the helical gear and the output shaft from coming off in the thrust direction after these are installed, this is the same as the above-described third example. In the fourth example, as the dislocation preventive structure, curling is formed on the opening side of the fixed shaft through the use of a roller-shaped curling tool (cutting knife). FIG. 5A is a view in which the fixed shaft has been seen from the curling side. Also, FIG. 5C is a view in which the curling tool (cutting knife) has been seen from different directions respectively. While rotating such a curling tool, a load is applied to the opening side of the fixed shaft in the axial direction from top to bottom in the figure, whereby there is formed curling which widens the opening side of the fixed shaft in a trumpet shape by radius portions of curling tools arranged in a pair.

The disclosure of Japanese Patent Application No.2003-398468 filed Dec. 28, 2003 including specification, drawings and claims is incorporated herein by reference in its entirety.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

What is claimed is:

1. A gear unit of a motor, the gear unit comprising:
a motor portion having a motor shaft;
a worm receiving driving torque from said motor portion via said motor shaft;
a helical gear receiving torque from said worm;
an output shaft, said output shaft rotating with said helical gear for transmitting the torque to an outside location;
a gear box composed of resin;
a fixed shaft fixed to said gear box at a center position thereof, said fixed shaft being constructed in a hollow and cylindrical shape having an opening at one end portion thereof, and a ceiling surface at least partially closing another end portion thereof, said open side end portion of said fixed shaft being subjected to dislocation preventive work, said open side end portion being fixed to said gear box, said dislocation preventive work including a collar-shaped portion formed on an outer periphery of said fixed shaft on said open side end portion, said collar-shaped portion protruding from the outer periphery of said open side end portion in a radial direction, said radial direction being perpendicular to a longitudinal direction of said fixed shaft, said output shaft and said helical gear being arranged on said fixed shaft, said hollow fixed shaft being fixed to said gear box via molding resin that is inserted into said gear box and said fixed shaft, wherein molding resin located in an interior portion of said hollow fixed shaft engages said resin of said gear box to fix said fixed shaft to said gear box.

2. The gear unit of a small motor according to claim 1, wherein a snap ring is pressed into the closed end portion of said fixed shaft.

3. The gear unit of a small motor according to claim 1, wherein said fixed shaft is constructed in said hollow and cylindrical shape by deep drawing a plate-shaped member.

4. The gear unit of a small motor according to claim 1, wherein said ceiling surface has a hole such that said fixed shaft breathes on insert molding.

5. A gear unit of a motor, the gear unit comprising:
a motor portion having a motor shaft;
a worm receiving driving torque from said motor portion via said motor shaft;
a helical gear receiving torque from said worm;
an output shaft;
a gear box formed of resin;
a fixed shaft fixed to said gear box at a center position thereof via resin of said gearbox, wherein an interior portion of said fixed shaft is at least partially filled with molding resin, said resin of said gear box engaging said fixed shaft to form an integrally connected shaft gear box structure, said output shaft rotating with said helical gear about said fixed shaft for transmitting the torque to the outside, said fixed shaft being constructed of a hollow and cylindrical shape having an opening at one end portion thereof and a ceiling surface at least partially closing another end portion thereof, said another end portion having a knurled surface formed via dislocation preventive work, said another end portion being fixed to said gear box, said end defining said opening having a plurality of projections formed via cutting-staking for preventing said output shaft and said helical gear from being removed in a thrust direction, each of said projections being located at a spaced location from another one of said projections, each of said projections extending in a radial direction, said radial direction being perpendicular to a longitudinal direction of said fixed shaft.

6. The gear unit of a small motor according to claim 5, wherein said fixed shaft is constructed in said hollow and cylindrical shape by deep drawing a plate-shaped member.

7. A gear unit of a motor, the gear unit comprising:
- a motor portion having a motor shaft;
- a worm element receiving driving torque from said motor portion via said motor shaft;
- a helical gear connected to said worm element such that said helical gear receives torque from said worm gear;
- an output shaft;
- a gear box composed of resin;
- a hollow cylindrical shaft fixed to said gear box at a center position thereof via an insert molding process, said hollow cylindrical shaft defining an opening at a first end portion thereof, said hollow cylindrical shaft being partially closed at a second end portion thereof, said first end portion having a dislocation preventive worked surface, said first end portion being fixed to said gear box, said output shaft and said helical gear being arranged adjacent to said hollow cylindrical shaft such that said output shaft rotates with said helical gear about said hollow cylindrical shaft to transmit torque to an outside location, wherein molding resin is inserted into an interior of said hollow cylindrical shaft, said molding resin in said hollow cylindrical shaft engaging said resin of said gear box to form an integrally connected gear box shaft structure, at least a portion of said hollow cylindrical shaft being filled with said molding resin, said dislocation preventive worked surface including a collar-shaped projection extending from an outer peripheral surface of said first end portion in a radial direction, said radial direction being perpendicular to a longitudinal direction of said hollow cylindrical shaft, said collar-shaped projection engaging said resin of said gear box.

8. The gear unit of a small motor according to claim 7, wherein said first end portion is fixed to said gear box and a snap ring is pressed into said second end portion of said hollow cylindrical shaft such that said helical gear and said output shaft remain adjacent to said hollow cylindrical shaft.

9. The gear unit of a small motor according to claim 7, wherein said hollow cylindrical shaft is formed via deep drawing a plate-shaped member.

10. The gear unit of a small motor according to claim 7, wherein said second end portion has a hole in communication with an outside environment such that gas passes through said hole from an interior of said fixed shaft during insert molding.

11. The gear unit of a small motor according to claim 7, wherein said dislocation preventive worked surface of said second end portion is a knurled surface, said knurled surface being formed via dislocation preventive work.

12. The gear unit of a small motor according to claim 7, wherein said dislocation preventive work surface includes a collar-shaped portion formed on an outer periphery of said fixed shaft on said open side portion, said collar-shaped portion engaging said resin of said gear box.

* * * * *